(12) United States Patent
Fang (10) Patent No.: US 9,348,841 B2
(45) Date of Patent: May 24, 2016

(54) TRANSACTION PROCESSING METHOD AND SYSTEM

(71) Applicant: Huawei Technologies Co., Ltd., Shenzhen (CN)

(72) Inventor: Xin Fang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/733,705

(22) Filed: Jun. 8, 2015

(65) Prior Publication Data

US 2015/0269185 A1    Sep. 24, 2015

Related U.S. Application Data

(63) Continuation of application No. PCT/CN2013/086572, filed on Nov. 5, 2013.

(30) Foreign Application Priority Data

Oct. 29, 2013    (CN) .................. PCT/CN2013/086169

(51) Int. Cl.
*G06F 17/30* (2006.01)
*G06F 9/54* (2006.01)

(52) U.S. Cl.
CPC .......... *G06F 17/30227* (2013.01); *G06F 9/542* (2013.01); *G06F 17/30* (2013.01)

(58) Field of Classification Search
CPC .... G06F 17/30227; G06F 17/30; G06F 9/542
See application file for complete search history.

(56) References Cited

U.S. PATENT DOCUMENTS

| | | | | |
|---|---|---|---|---|
| 4,853,843 | A | * | 8/1989 | Ecklund |
| 5,781,910 | A | * | 7/1998 | Gostanian et al. ............ 707/610 |
| 8,676,851 | B1 | * | 3/2014 | Nesbit et al. .................. 707/791 |
| 2009/0300083 | A1 | | 12/2009 | Herold et al. |
| 2013/0132458 | A1 | * | 5/2013 | Little ........................... 709/201 |
| 2014/0108473 | A1 | * | 4/2014 | Nowoczynski et al. ...... 707/826 |
| 2014/0173326 | A1 | * | 6/2014 | Belluomini et al. ............. 714/2 |
| 2014/0310253 | A1 | * | 10/2014 | Meng et al. ................... 707/703 |

FOREIGN PATENT DOCUMENTS

| | | |
|---|---|---|
| CN | 101046815 A | 10/2007 |
| CN | 101706811 A | 5/2010 |
| CN | 102750322 A | 10/2012 |
| CN | 103064635 A | 4/2013 |

OTHER PUBLICATIONS

Thomson et al., "Calvin: Fast Distributed Transactions for Partitioned Database Systems", May 20, 2012, ACM, pp. 1-12.*

* cited by examiner

*Primary Examiner* — Etienne Leroux
*Assistant Examiner* — Jared Bibbee
(74) *Attorney, Agent, or Firm* — Leydig, Voit & Mayer, Ltd.

(57) ABSTRACT

The present invention provides a transaction processing method, which is applied to a node presenting a coordinator, where the coordinator is communicatively connected to nodes presenting participants. The method includes: sending, by the coordinator, a query message to each participant; drawing, by the coordinator, a conclusion according to response messages, executing, by the coordinator, the conclusion, and sending the conclusion to the participants, where the conclusion can be determined by a transaction ID, a object ID and a change information.

9 Claims, 5 Drawing Sheets

TRANSACTION PROCESSING METHOD AND SYSTEM

CROSS-REFERENCE TO RELATED APPLICATION

This application is a continuation of International Patent Application No. PCT/CN2013/086572, filed on Nov. 5, 2013, which claims priority to International Application No. PCT/CN2013/086169, filed on Oct. 29, 2013, both of which are hereby incorporated by reference in their entireties.

TECHNICAL FIELD

The present invention relates to the field of information technologies, and in particular, to a transaction processing method and apparatus.

BACKGROUND

An object-based storage system (Object-Based Storage System) is a distributed storage system and is formed by a plurality of object-based storage devices OSDs (Object-based Storage Devices). The OSDs are interconnected through a network, and an OSD may also be called a node in the object-based storage system. In the object-based storage system, an object (Object) is a most basic stored content unit, and the object includes data and attribute information of the data. The data refers to content stored in the object, for example, a video file, a music file, or the like; and the attribute information of the data is, for example, a size of a file, version information, or the like.

For reliability of a stored object, one object is generally stored in different OSDs. In this way, even if a part of OSDs are faulty, a read operation and a write operation for the object are not affected, thereby improving data reliability. Because a same object needs to be stored in different nodes after being backed up with many copies, and in other words, the object is stored across a plurality of OSD nodes, these backups of data may also be called copies. In order to ensure a consistency requirement of object-based storage, a write operation on an object needs to be ensured by a transaction. A transaction may be understood as a group of operations for a data change. In the group of operations, the data will not be changed unless all the operations are successful. This ensures that copies of a same object in different OSDs are the same, thereby avoiding that a part of the copies are changed but the other part of the copies are not changed.

A transaction is a set of a series of operations, these operations are often executed in parallel by a plurality of nodes so that data distributed in a plurality of nodes is transformed from a consistent state to another consistent state (in a distributed object-based storage system, this means a same object in the plurality of nodes has a same version number); and either all or none of the operations constituting the series of operations are executed, thereby maintaining consistency of a data state in the nodes. In a non-storage field, a situation in which a transaction is required also exists.

The existing two-phase commitment protocol (Two-phase Commitment Protocol, 2PC) can ensure atomicity of distributed transaction commitment. The 2PC protocol appoints an OSD of a distributed transaction as a coordinator (Coordinator), and appoints all other OSDs as participants (Participants). Only the coordinator has determining power of committing or revoking a transaction; and after making a conclusion of committing or revoking a transaction, the coordinator sends the conclusion to the participants. If the conclusion is to commit the transaction, a Commit message is sent; and if the conclusion is to abort the transaction, an Abort message is sent. Each participant receives the conclusion of the coordinator and executes an operation in a local database of the participant according to the conclusion; and the participants may also propose, to the coordinator, an intention of revoking or committing a sub-transaction.

When the participants are waiting for a conclusion of the coordinator, if the coordinator is faulty, the participants will wait a long time for the conclusion of the coordinator. During a waiting period, a transaction of each participant cannot be completed, and an occupied resource cannot be released, resulting in blocking. In order to avoid blocking, the prior art proposes a state acknowledgment technology, where a participant queries a transaction state of other participants to confirm whether the participant needs to execute the transaction. However, in this method, interactive processes between participants are excessive, resulting in reduction of system performance.

Even if the coordinator is not faulty, how to draw a transaction conclusion by reading information of the participants is also a problem to be solved.

SUMMARY

The present invention provides a transaction processing method, where the method can draw a transaction conclusion by reading information of participants.

According to a first aspect, an embodiment of the present invention provides a transaction processing method, which is applied to a coordinator, where the coordinator is communicatively connected to participants, and an object operated by a transaction is formed by a plurality of sub-objects, where one of the sub-objects is in the coordinator, and the other sub-objects are in different participants, and the method includes: sending, by the coordinator, a query message to each participant, where the query message carries a transaction ID, an object ID, and change information of the object, where the transaction ID is used to identify the transaction, the object ID is used to identify the object, the change information corresponds to content of the object, and content of the object with different change information is different; receiving, by the coordinator, a response message for the query message from each participant; and drawing, by the coordinator, a conclusion according to the response messages, executing, by the coordinator, the conclusion, and sending the conclusion to all the participants, where the conclusion includes at least one of the following: if any one of the response messages carries first information, the conclusion is to execute the transaction, where the first information indicates that the participant does not contain the transaction ID and contains the object ID, and the change information of the object in the participant is the same as the change information of the object in the coordinator; or, if any one of the response messages carries second information, the conclusion is to abort the transaction, where the second information indicates that the participant does not contain the transaction ID and contains the object ID, and the change information of the object in the participant is different from the change information of the object in the coordinator.

In a first implementation manner of the first aspect, the conclusion further includes at least one of the following: if all the response messages carry third information, the conclusion is to execute the transaction, where the third information indicates that the participant contains the transaction ID; and, if any one of the response messages carries fourth information, the conclusion is to execute the transaction, where the fourth information indicates that the participant does not contain the transaction ID, and the participant does not contain the object ID.

According to a second aspect, an embodiment of the present invention provides a transaction processing apparatus, which is communicatively connected to participants, where an object operated by a transaction is formed by a plurality of sub-objects, where one of the sub-objects is in the transaction processing apparatus, and the other sub-objects are in different participants, and the apparatus includes: a querying module, configured to send a query message to each participant, where the query message carries a transaction ID, an object ID, and change information of the object, where the transaction ID is used to identify the transaction, the object ID is used to identify the object, the change information corresponds to content of the object, and content of the object with different change information is different; a receiving module, configured to receive a response message for the query message from each participant; a deciding module, configured to draw a conclusion according to the response messages, and send the conclusion to all the participants, where the conclusion includes at least one of the following: if any one of the response messages carries first information, the conclusion is to execute the transaction, where the first information indicates that the participant contains the transaction ID and contains the object ID, and the change information of the object in the participant is the same as the change information of the object in a transaction processing apparatus; or, if any one of the response messages carries second information, the conclusion is to abort the transaction, where the second information indicates that the participant contains the transaction ID and contains the object ID, and the change information of the object in the participant is different from the change information of the object in a coordinator; and an executing module, configured to execute the conclusion of the deciding module.

In a first implementation manner of the second aspect, the conclusion further includes at least one of the following: if all the response messages carry third information, the conclusion is to execute the transaction, where the third information indicates that the participant contains the transaction ID; and, if any one of the response messages carries fourth information, the conclusion is to execute the transaction, where the fourth information indicates that the participant does not contain the transaction ID, and the participant does not contain the object ID.

According to a third aspect, an embodiment of the present invention provides a transaction processing method, which is applied to a coordinator, where the coordinator is communicatively connected to participants, and an object operated by a transaction is formed by a plurality of sub-objects, where one of the sub-objects is in the coordinator, and the other sub-objects are in different participants, and the method includes: sending, by the coordinator, a query message to each participant, where the query message carries a transaction ID and an object ID, where the transaction ID is used to identify the transaction, the object ID is used to identify the object, the change information corresponds to content of the object, and content of the object with different change information is different; receiving, by the coordinator, a response message for the query message from each participant, where the response message carries the fifth information, where the fifth information indicates that the participant does not contain the transaction ID but contains the object ID, and the fifth information further carries change information of the object in the participant that sends the response message; and drawing, by the coordinator, a conclusion according to the response messages, executing, by the coordinator, the conclusion, and sending the conclusion to all the participants, where the conclusion includes at least one of the following: if the change information of the object in the participant is the same as the change information of the object in the coordinator, the conclusion is to execute the transaction; or, if the change information of the object in the participant is different from change information of the object in the coordinator, the conclusion is to abort the transaction.

In a first implementation manner of the third aspect, the conclusion further includes at least one of the following: if all the response messages carry third information, the conclusion is to execute the transaction, where the third information indicates that the participant contains the transaction ID; and, if any one of the response messages carries fourth information, the conclusion is to execute the transaction, where the fourth information indicates that the participant does not contain the transaction ID, and the participant does not contain the object ID.

According to a fourth aspect, an embodiment of the present invention provides a transaction processing apparatus, which is communicatively connected to participants, where an object operated by a transaction is formed by a plurality of sub-objects, where one of the sub-objects is in the transaction processing apparatus, and the other sub-objects are in different participants, and the apparatus includes: a querying module, configured to send a query message to each participant, where the query message carries a transaction ID and an object ID, where the transaction ID is used to identify the transaction, and the object ID is used to identify the object; a receiving module, configured to receive a response message for the query message from each participant, where the response message carries the fifth information, which indicates that the participant does not contain the transaction ID and contains the object ID, and the fifth information further carries change information of the object in the participant that sends the response message; a deciding module, configured to draw a conclusion according to the response messages, execute the conclusion by the transaction processing apparatus, where the change information corresponds to content of the object, and content of the object with different change information is different, and send the conclusion to all the participants, where the conclusion includes at least one of the following: if the change information of the object in the participant is the same as change information of the object in the coordinator, the conclusion is to execute the transaction; or, if the change information of the object in the participant is different from change information of the object in the coordinator, the conclusion is to abort the transaction; and an executing module, configured to execute the conclusion of the deciding module.

In a first implementation manner of the fourth aspect, the conclusion further includes at least one of the following: if all the response messages carry third information, the conclusion is to execute the transaction, where the third information indicates that the participant contains the transaction ID; and, if any one of the response messages carries fourth information, the conclusion is to execute the transaction, where the fourth information indicates that the participant does not contain the transaction ID, and the participant does not contain the object ID.

In an implementation manner of the foregoing aspects, the change information of the object may be a version number of the object.

According to the method provided by embodiments of the present invention, by detecting change information of an object in a participant, a transaction conclusion can be drawn, thereby improving efficiency of transaction processing.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and other drawings may still be derived from these accompanying drawings.

DESCRIPTION OF EMBODIMENTS

The following clearly and completely describes the technical solutions of the present invention with reference to the accompanying drawings in the embodiments of the present invention. Apparently, the described embodiments are merely a part rather than all of the embodiments of the present invention. All other embodiments obtained based on the embodiments of the present invention shall fall within the protection scope of the present invention.

A transaction is a set of a series of operations. A transaction may include a plurality of operations, but all the included operations are indivisible; and either all or none of the operations are executed. An operation on N+M nodes may serve as a transaction. If an operation is performed on any one or more nodes, the same type of operation needs to be also executed on the other nodes.

A transaction is executed by a coordinator and participants together. The coordinator generates a conclusion by making a decision, the participants execute the conclusion of the coordinator, and the participants may also provide a decision basis for the coordinator.

In the two-phase commitment protocol, a system generally includes two types of nodes: one type is a coordinator (Coordinator), and there is generally one coordinator in one transaction; the other type is participants (Participants), and there may be a plurality of participants. Each node may record a write-ahead log (Write-ahead Log) and store the write-ahead log permanently, and even if a node is faulty, the log is not lost. Steps of a feasible method for transaction negotiation are as follows: (1) The coordinator sends an operation request to each participant, where the operation request may agree or disagree to execute a transaction. The operation request is used to negotiate with the participants and does not need to be executed by the participants. (2) After receiving the operation request from the coordinator, the participant returns a response message, where the response message carries whether the participant agrees to the operation request of the coordinator. For example, the response message may agree to the operation request of the coordinator, or reject the operation request of the coordinator; and the participant enters a waiting phase to wait for a decision of the coordinator. (3) The coordinator summarizes the response message of each participant to make a decision and draw a conclusion, and sends the conclusion to each participant. (4) After receiving the conclusion, each participant executes the conclusion and releases a resource occupied by the transaction.

In the foregoing process of transaction negotiation and processing, an exception may occur. For example, in step (4), the coordinator may be faulty so that conclusions sent to a part of the participants are not successfully sent, or a participant is faulty and does not receive the conclusion, or, for another reason, a part of the participants do not receive the conclusion. These cases that a part of the participants do not receive the conclusion are uniformly called a coordinator failure. The coordinator failure causes a part of the participants to execute the conclusion of the transaction, but the other part of the participants not to execute the conclusion of the transaction. These participants that do not receive the conclusion will always stay in the waiting phase, or called a prepared (Prepared) state, and a resource occupied by the transaction cannot be released in time. This phenomenon is called blocking.

In the prior art, in order to avoid blocking, after receiving the decision conclusion of the coordinator, the participants do not release a resource occupied by the transaction. The foregoing step (4) is replaced with (5) and (6), where: (5) After executing the conclusion, the participant needs to record the received conclusion in a log manner and sends a message to other participants to notify the other participants that the participant has received the conclusion; and (6) After a certain participant receives conclusions from all the other participants, it is proved that no exception occurs, and therefore a resource occupied by the transaction can be released, and an operation log is recorded again.

Although the prior art can solve the problem of blocking to some extent, in order to avoid system blocking when an exception occurs, no matter an exception occurs or not, such operations as negotiation and recording a log in step (5) and (6) are executed for each execution of a transaction, thereby consuming system resources.

In order to facilitate understanding, in the embodiments of the present invention, a storage system, especially a distributed object-based storage system is used as an example. However, the present invention is not limited to distributed storage, and is also applicable to another technical field in which a transaction is required. In a storage field, a transaction may be writing data, deleting data, or modifying data. An object is a target of a transaction operation, such as a piece of data. The data may be identified as a file name, a serial number, a path, a logic address, or a physical address. For example, a transaction of "create" may write new data into target data; and a transaction of "delete" may delete target data.

It should be noted that object-based storage is a type of the distributed storage. The embodiments of the present invention may be applied to the object-based storage, or other distributed storage, and the object in the embodiments of the present invention is not intended to limit the embodiments of the present invention to the field of the object-based storage. In the distributed storage, stored data may be called an object, such as a certain type or a part of a certain type of a file, a text, a picture, a data stream and computer code. In the embodiments of the present invention, an object is data that can be operated by a transaction. In the embodiments of the present invention, data may be divided into a plurality of sub data blocks, and each sub data block is stored in one storage node. Storage nodes may be physically separated or logically separated. For example, a storage node may be, for example, a storage cluster, a storage server, a hard disk, a hard disk partition, or a folder.

In the embodiments of the present invention, a version number of an object may identify whether the object changes; and a version number of an object is used in each sub-object forming the object. For example, after an object is created or modified, the object has a new version number, and version numbers of the sub-objects of the object are correspondingly updated. A version number can identify consistency of sub-objects in the object.

In another embodiment, besides the version number, other information may also be used to identify whether the object changes, for example, a name of the object, a size of storage space occupied by the object, and an attribute of the object. Information that can record whether content of the object changes is uniformly called change information of the object. The change information corresponds to the content of the object, and content of the object with different change information is different. That any sub-object changes is equivalently that the whole content of the object changes; and correspondingly, the whole change information of the object needs to be updated. In the embodiments of the present invention, for ease of description, a version number of an object is used as an example to introduce the change information of the object.

A data file object is divided into N service data blocks with a same length, and a lack part may be filled by 0. The N data blocks are encoded and calculated to generate M check data blocks, and the N+M data blocks are stored in N+M different nodes, where N and M are both natural numbers. If any M parts of data are faulty, the remaining N parts of the data may be used to calculate the faulty data; and this data recovery technology may be called erasure code (Erasure Code, EC). A set of the N+M data blocks may be called an object, and any one of the N+M data blocks is called a sub-object.

These N+M sub-objects are correlative, and if any one of the sub-objects is updated, all the remaining sub-objects also need to be updated, thereby maintaining consistency of the sub-objects. The consistency of the N+M sub-objects can be ensured by a transaction. Before the object is divided into N sub-objects, a version number may be allocated to the object, and the version number of the object is recorded into the N+M sub-objects that are generated by the object. Therefore, the consistency is identified by using the version number of the object. If the N+M sub-objects are consistent, they have a same version number; and if version numbers of data in a part of nodes are different from those of data in other nodes, it means that data is inconsistent.

Different version numbers may be caused by many reasons, for example, a node is faulty for a period of time, during the faulty period, if the node misses some operations of writing a sub-object; the sub-object in the faulty node is inconsistent with a sub-object in a node on which the writing operations have been executed, and the version numbers are different. When a client reads these sub-objects from a distributed storage system, these inconsistent sub-objects can be discovered. The N parts of sub-objects with consistent versions may be used to recover the inconsistent sub-objects according to an error checking manner to recover sub-objects consistent with the N parts of sub-objects.

According to the method provided by the embodiments of the present invention, when an original coordinator is faulty, a new coordinator is reselected from the participants. The new coordinator can draw a transaction conclusion by detecting change information of objects of other participants. However, in the prior art, in order to deal with blocking when the coordinator is faulty, no matter whether the coordinator is faulty or not, a same procedure is adopted to draw a transaction conclusion. This procedure is more complex than a transaction processing technology adopted in this application when the transaction is not faulty. Therefore, the overall efficiency of this application is higher, and an exception (for example, when the coordinator is faulty) processing mechanism is provided, thereby simplifying a procedure of transaction processing when no exception occurs.

Even if the original coordinator is not faulty, the solution of this application also provides a new negotiation mechanism, where a transaction conclusion can be drawn by negotiation.

Embodiment 1

The embodiment of the present invention provides a transaction processing method, which is applied to a coordinator, where the coordinator is communicatively connected to participants, and an object operated by a transaction is formed by a plurality of sub-objects, where one of the sub-objects is in the coordinator, and the other sub-objects are in different participants, and the method includes: sending, by the coordinator, a query message to each participant, where the query message carries a transaction ID, an object ID, and a version number of the object, where the transaction ID is used to identify the transaction and the object ID is used to identify the object; receiving, by the coordinator, a response message for the query message from each participant; and drawing, by the coordinator, a conclusion according to the response messages, executing, by the coordinator, the conclusion, and sending the conclusion to all the participants.

The conclusion includes at least one of the following: if any one of the response messages carries first information, the conclusion is to execute the transaction, where the first information indicates that the participant does not contain the transaction ID and contains the object ID, and the version number of the object in the participant is the same as a version number of the object in the coordinator; or, if any one of the response messages carries second information, the conclusion is to abort the transaction, where the second information indicates that the participant does not contain the transaction ID and contains the object ID, and the version number of the object in the participant is different from a version number of the object in the coordinator.

The conclusion further includes at least one of the following: if all the response messages carry third information, the conclusion is to execute the transaction, where the third information indicates that the participant contains the transaction ID; and, if any one of the response messages carries fourth information, the conclusion is to execute the transaction, where the fourth information indicates that the participant does not contain the transaction ID, and the participant does not contain the object ID.

The coordinator may have functions of simultaneously detecting whether the first information and the second information exist and drawing a conclusion according to a detecting result. Alternatively, the coordinator may have functions of simultaneously detecting whether the first information, the second information, the third information, and the fourth information exist, and drawing a conclusion according to a detecting result. Alternatively, the coordinator may have functions of only detecting whether any one of the first information, the second information, the third information, and the fourth information exists, and drawing a conclusion according to a detecting result.

Figure 1:
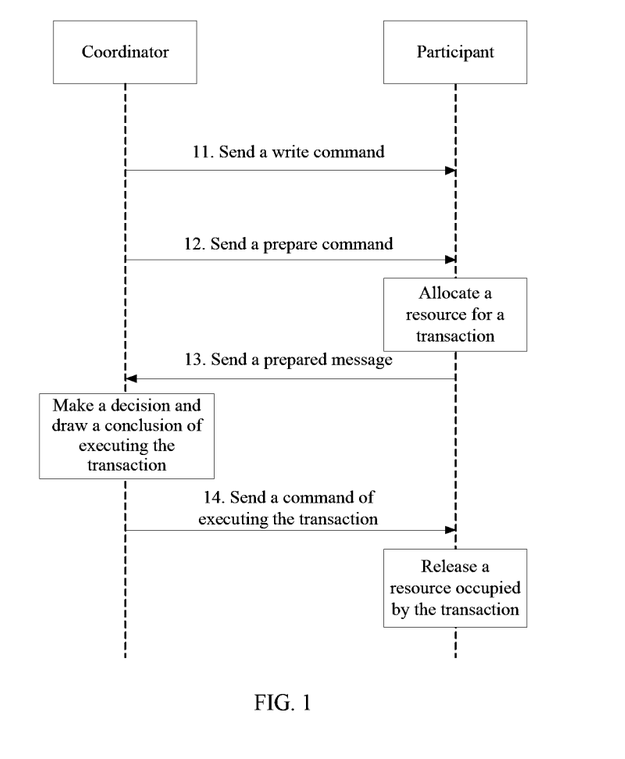
FIG. 1 is a flowchart of a transaction processing method according to an embodiment of the present invention.

Refer to FIG. 1, which illustrates specific implementation steps of an embodiment of a transaction execution method according to an embodiment of the present invention. The method is applied to a transaction processing system formed by a coordinator and a plurality of participants, and an object operated by a transaction is formed by a plurality of sub-objects. The coordinator may store no sub-object, and the coordinator performs coordination on the transaction; and the sub-objects are in different participants separately. For example, a participant may be an OSD. The transaction execution may include the following steps.

Step 11: The coordinator sends an operation request to each participant, where the operation request carries a transaction ID, an operation type, and an object version number Version_T recorded in the coordinator. If the operation type of the transaction is writing data, the operation request may also carry to-be-written data.

The operation request may instruct the participant to prepare for operating an object. The transaction ID identifies a transaction; and the identified transaction associates with the object operated by the transaction.

For example, a write (Write) command is sent to N+M participants, where the write command carries a transaction ID, an operation type, and an object version number Version_T recorded in the coordinator, and the operation type is, for example, write or delete. When the operation type is write, the write command may also carry to-be-written data that is prepared to be written into each sub-object.

Step 12: The coordinator sends a prepare (Prepare) command to each participant, where the Prepare command carries the transaction ID, an object ID, the object version number recorded in the coordinator, and a list of participants.

The object ID is an ID of an object operated by the transaction identified by the transaction ID; the object version number is a version number of the object identified by the object ID; and the list of participants records all the participants.

Step 13: After receiving the prepare (Prepare) command from the coordinator, a participant stores the list of participants and allocates a resource for the transaction. After allocating the resource, the participant sends a prepared (Prepared) message to the coordinator, and the participant enters a Prepared phase. In another embodiment, if the participant does not find the transaction ID, or the participant does not meet a condition of executing the transaction, the participant sends a message to notify the coordinator.

Step 14: The coordinator makes a decision and sends a conclusion draws from the decision to each participant. For example, when all the participants feed back Prepared messages, a decision conclusion is to execute the transaction, and the conclusion is sent to each participant. When the conclusion is to execute the transaction, the conclusion may be indicated by using a Commit message. In another case, the conclusion may be aborting the transaction.

Step 15: A participant receiving the conclusion of the decision maker executes the conclusion. Then the participant releases the resource occupied by the transaction.

A non-blocking transaction processing method in the prior art is different from that in step 11 to step 14. For example, in step (11), none of the object ID, the operation type, and the version number Version_T of this transaction is sent.

According to the embodiment of the present invention, information exchange between nodes is decreased, and logs that need to be recorded are reduced. Compared with the prior art, fewer system resources are occupied, and time of processing a transaction is shorter.

In the following, a coordinator failure is used as an example to introduce a transaction processing embodiment when an exception occurs. It should be noted that, after the coordinator is faulty, a new coordinator is elected from the participants, and therefore, in order to distinguish the faulty coordinator and the newly elected coordinator, unless otherwise specified, in step 21 to step 29 and in another relevant embodiment, the fault coordinator is called an original coordinator, and the original coordinator can work normally before the failure; and the newly elected coordinator is called a coordinator. That is, the coordinator in step 11 to step 15 is called an original coordinator in step 21 to step 29 and in step 37 and step 38.

Embodiment 2

In the embodiment of the present invention, when a coordinator is faulty, data consistency is ensured by querying a transaction state and a current version number between participants. In the embodiment of the present invention, with update of a version, version numbers may adopt an ascending rule, or may adopt a descending rule. In another embodiment, a letter or another non-numeric value may be used as a version number, so long as the version number is unique, and the participants and the coordinator agree on a change rule of the version numbers with the update of the version. In order to facilitate introduction, that a value of the version number ascends with the update of the version is used as an example subsequently. Each operation of write leads to ascending of the object version, and content of a new version is a substitution for content of an old version. A sub-object of the new version and a sub-object of its old version can be written into a same OSD, and the sub-object of the old version is overwritten. A transaction operation may be operated on all sub-objects of an object, and these sub-objects are distributed in different OSDs. An OSD may include a controller and a storage medium, where the controller is configured for management, and the storage medium is configured to store data, for example, a hard disk (Hard Disk), a solid state disk (SSD), or a magnetic tape. The OSD may also be a storage server or a personal computer.

Figure 2:
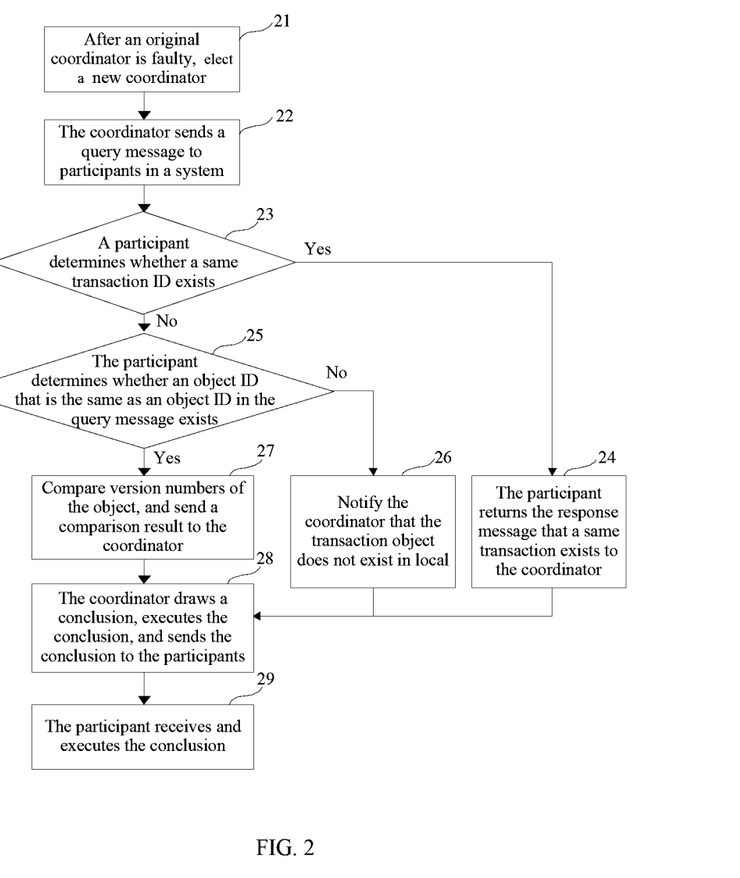
FIG. 2 is a flowchart of a transaction processing method according to an embodiment of the present invention.

Step 21: After an original coordinator in a distributed storage system is faulty, elect a new coordinator from the participants. Step 21 may be performed after step 13 or step 14; for example, after step 14 is performed, if the participant does not receive a conclusion from the coordinator within a preset time, step 21 is performed. Step 21 is an optional step.

A new coordinator may be generated by election; and there may be many specific election methods, for example, a participant may be directly appointed as the coordinator, or a participant with a minimum number may be selected as the coordinator, or a participant with best performance may be selected as the coordinator. It should be noted that the elected coordinator stores a sub-object, and therefore the coordinator has a part of functions of a participant. Unless otherwise specified, a coordinator mentioned in the following steps refers to the newly elected coordinator.

In the embodiment of the present invention, a participant stores a list of participants, and a participant may be elected from the participants recorded in the list of participants as the coordinator. The list of participants records OSDs where all sub-objects of an object are located. In this step, a new coordinator is elected from the N+M participants.

In the embodiment of the present invention, a coordinator failure is a sort of general reference, which refers to that a participant does not receive a conclusion sent by the coordinator. For example, it may refer to that the coordinator cannot work normally, communication between the coordinator and the participants are interrupted, or a participant is faulty. A fault reason may be a software fault or a hardware fault. In another embodiment, a physical or software fault may not occur, but an administrator instruction is used to elect a new coordinator.

Step 22: The coordinator sends a query message to the participants in the system, where the query message records a transaction ID, an object ID, and a target version number Version_T of the object, of the transaction that needs to be queried.

The transaction ID is used to identify an operation of this transaction. Different transactions have different transaction IDs, and all operations with a same transaction ID belong to operations of a same transaction. In the embodiment of the present invention, these operations are separately executed by N+M OSDs. The object ID is used to identify an object operated by the transaction ID, for example, a file name of the object may be used as an object ID. The target version number of the object is a target version number of the object identified by the object ID. If the transaction conclusion is to execute the transaction, versions of sub-objects stored in the participants and the coordinator all change to the target version number, or in other words, the version of the object changes to the target version number. Besides the file name, other manners may also be used to identify the object ID. The storage system may use data of 2K byte to record this identifier. Receivers of the query message are all the participants except the coordinator in the list of participants.

After receiving the query message, a participant can search whether it has a transaction with a same transaction ID and a same object ID; and if the participant has a transaction with the same transaction ID and the same object ID, the participant further determines whether a current version number of the sub-object of the participant is the same as the target version number, and infers a transaction conclusion according to consistency of versions.

The target version number may come from the original coordinator, like step 11.

Step 23: The participant that receives the query message determines whether a same transaction exists in local according to the transaction ID in the query message. A specific determining manner is to search whether a same transaction ID exists in local transaction IDs. If yes, step 24 is performed; and if not, step 25 is performed.

Step 24: The participant that receives the query message returns a response message carrying "the same transaction exists" information to the coordinator. In this embodiment, the information carried in the response message is called third information.

The response message is sent after the participant finds a same transaction ID in local. If the participant does not find the same transaction ID in local, the response message is not sent. The response message can let a decider know that the participant receives the query message and responds successfully. The response message can also let the decider know that the participant does not know a decision result and is in a phase of waiting for a decision.

Step 25: The participant that receives the query message search whether the object exists in local, that is, determines whether an object ID, which is the same as the object ID in the query message, exists in all local object IDs. If yes, step 27 is performed; and if not, step 26 is performed.

Step 26: The participant that receives the query message returns a response message to the coordinator to notify the coordinator that neither the transaction nor the object exists in local, where the information may be indicated by using "the object does not exist" or "neither the transaction nor the object exists", and the information may be called fourth information.

Step 27: The participant that receives the query message reads a version number Version_C of the object identified by the object ID, compares the Version_T with the Version_C, and feeds back, to the coordinator, a response message for the query message by using a comparison result.

That a later version requires a greater version number is used as an example. (1) If Version_C>Version_T, "a version number of the object in the participant is later than the target version number" information is carried in information returned to the coordinator, where the message is called a "version is later" message for short in the following. (2) If Version_C=Version_T, "the version number of the object in the participant is the same as the target version number" information is carried in information returned to the coordinator, where the message is indicated by "versions are the same" in the following. (3) If Version_C<Version_T, "a version number of the object in the participant is older than the target version number" information is carried in information returned to the coordinator, where the message may be indicated by "version is older".

In another embodiment, because processing manners of "version is later" and "version is older" in the following steps are the same, the two cases may be combined to feed back a message "versions are different". That is, in this step, it may not need to compare numbers of the Version_C and the Version_T, and it only needs to compare whether the versions are the same. The returned response message is "versions are the same" or "versions are different".

That is, the response message sent by the participant in this step may carry first information or second information. The first information is "versions are the same" information and content of the information may also be "Equal". The first information may be obtained by the participant after transaction ID determining, object ID determining, and version number determining. The first information may indicate that the participant does not contain the transaction ID and contains the object ID, and the version number of the object in the participant is the same as the target version number. The second information is "versions are different" information, and content of the information may also be "Unequal". The second information may be obtained by the participant after transaction ID determining, object ID determining, and version number determining. The second information may indicate that the participant does not contain the transaction ID and contains the object ID, and the version number of the object in the participant is different from the target version number.

Step 28: After receiving the response messages sent by the participants, where the response message carries one of the first information, the second information, the third information, and the fourth information, the coordinator draws a conclusion according to content of the response messages. The conclusion needs to be executed by the coordinator and the participants. The coordinator executes the conclusion, sends the conclusion to the participants in the system, and releases a resource occupied by the transaction on the coordinator. That the coordinator and the participants execute the conclusion together can ensure transaction consistency.

The conclusion is to abort the transaction or execute the transaction. If the conclusion is to abort the transaction, an Abort message is sent; and if the conclusion is to execute the transaction, a Commit message is sent. If the conclusion is to abort the transaction, an execution manner is to abort the transaction. If the conclusion is to execute the transaction, the participants execute a series of operations of the transaction on sub-objects in the participants.

It should be noted that, in some embodiments, the participants separately determines the transaction ID, the object ID, and the version number, and therefore, any one of the first information, the second information, the third information, and the fourth information may be sent. However, in another embodiment, the participants detect only one item, for example, only detecting whether the first information exists, and therefore, the response message returned to the coordinator is the first information, excluding the second information, the third information, or the fourth information; and correspondingly, the coordinator does not generate a transaction conclusion for the second information, the third information, or the fourth information. In another embodiment, the first information and the second information may also be detected.

Table 1 introduces how the coordinator decides according to the information carried in the response message and draws a conclusion after receiving the response messages fed back by the participants, where the conclusion is to abort the transaction or execute the transaction. The aborting the transaction may be indicated by an Abort command; and the executing the transaction may be indicated by a Commit command. When deciding, the coordinator may also consider an operation type of the transaction, and the operation type may include create, modify, and delete, where both the create and the modify belong to write (Write). The operation type may come from the original coordinator, and is stored in the coordinator and the participants, for example, it is sent to the coordinator and the participants in step 11. The query message sent to the participants by the coordinator may also carry the operation type of the transaction.

For a transaction whose operation type is create or modify, one or more of the following rules are available: (a) If any participant returns "versions are the same" information, that is, the first information, it indicates that the participant returning the message has executed the transaction. The conclusion is to execute the transaction according to a principle that transactions "proceed together and draw back together". (b) If any participant returns "versions are different" information, that is, the second information, it indicates that a participant has performed an Abort action. The conclusion is to abort the transaction according to a principle that transactions "proceed together and draw back together". (c) If all the participants return information that the transaction exists, that is, the third information, it indicates that the coordinator does not provide a decision result of the transaction. In this case, all the participants are in a Prepared state, and although no participant has executed the transaction, the participants have prepared for executing the transaction and are in a state in which the transaction can be executed normally. Therefore, the conclusion is to execute the transaction. (d) If any participant returns "neither the transaction nor the object exists" information, that is, the fourth information, the conclusion is to abort the transaction.

For a transaction whose operation type is delete, one or more of the following conclusions are available: (a) If any participant returns the "versions are different" information, that is, the second information, it indicates that the participant has executed an Abort action. The conclusion is to abort the transaction. (b) If all the participants return the information that the transaction exists, that is, the third information, it indicates that the participant has executed the delete operation, and the coordinator does not provide a decision result of the transaction. In this case, all the participants are in a Prepared state, and although no participant has executed the transaction, the participants have prepared for executing the transaction. Therefore, the conclusion is to execute the transaction. (c) If any participant returns the "neither the transaction nor the object exists" information, that is, the fourth information, the conclusion is to execute the transaction. When the operation type is delete, the participants do not feed back the first information, because if the versions are the same, the object and the transaction are deleted, and the participant cannot find the object ID or the transaction ID, and therefore, the actually returned information is information that neither the transaction nor the object exists, that is, the fourth information.

It should be noted that, when operations are different, a same conclusion may be drawn according to some information. For this operation information, the operation type may not need to be determined, but the conclusion is drawn directly according to information carried in the response message. For example, so long as any participant returns a response message carrying "versions are different" information, the transaction conclusion can be determined as Abort. It does not need to know the operation type of the transaction to draw the Abort conclusion. In addition, if any participant returns "versions are the same" information, it does not need to determine the operation type, a Commit conclusion can be drawn.

For examples of a conclusion drawn by the coordinator, refer to Table 1.

TABLE 1

| Operation type | Information type | Returning object | Conclusion |
| --- | --- | --- | --- |
| Create/Modify | Versions are different | Any participant | Abort |
| Create/Modify | Versions are the same | Any participant | Commit |
| Create/Modify | The transaction exists, but the object does not exist | Any participant | Abort |
| Create/Modify | The transaction exists | All the participants | Commit |
| Delete | Versions are different | Any participant | Abort |
| Delete | The transaction exists, but the object does not exist | Any participant | Commit |
| Delete | The transaction exists | All the participants | Commit |

In addition, it should be noted that, in this embodiment, the query message carries three types of content, which are the transaction ID, the object ID, and the target version number. Because a part of conclusions can be drawn without performing determining for multiple times, for example, when response messages returned by all the participants carry "the transaction exists" information, it is adequate for drawing a conclusion of executing the transaction. It does not need to further determine whether the transaction ID exists in the participant, or to determine whether the version numbers are the same. Similarly, when a response message returned by any participant carries "the transaction exists, but the object does not exist" information, all the participants do not need to further determine whether the object version of the participant is the same as the object target version provided by the coordinator. Therefore, when sending the query message to the participants, the coordinator may only send the transaction ID, or may send the transaction ID and the object ID, or may send the transaction ID, the object ID, and the target version number of the object.

In addition, the query message may be sent in different phases: the coordinator sends the transaction ID to the participants for the first time; when the received response message is inadequate for drawing a conclusion, the coordinator then sends the object ID to the participants; and if the response message of the object ID is still inadequate for drawing a conclusion, the coordinator continues to send version number information to the participants. These sending methods can reduce data amount of the query message.

The current coordinator is generated by election, and before the election, the coordinator is also a role of a participant. Therefore, the coordinator also has a duty of a participant; and besides sending the conclusion to the participants to be executed by the participants, the coordinator also needs to execute the conclusion like a participant. In this embodiment, if the conclusion is to execute the transaction, the coordinator needs to execute a series of operations of the transaction, for example, a series of operations required for a delete operation or a series of operations for a data writing operation on sub-objects stored in the coordinator. An executing manner may be that the controller of the OSD generates an instruction of performing an operation on a storage medium, for example, an instruction of deleting data on the storage medium. After the instruction of performing the operation on the storage medium is generated, a log may be recorded, and this log may be Committed. When the operation is completed, that is, when the controller completes the operation, a log may be recorded, and this log may be Cleared. Then a resource, such as a storage resource, occupied by the transaction is released. Starting a process of executing a command may be called committing the transaction.

Step 29: After receiving the conclusion of the coordinator, the participant executes the conclusion. After the conclusion is executed, a resource occupied by the transaction may be released. For the coordinator, step 29 is an optional step.

If the conclusion is to execute the transaction, the participant executes a series of operations of the transaction, for example, executing a delete operation or a data writing operation on sub-objects stored in the participant. Specifically, if the conclusion is to execute the transaction, a executing manner may be that the controller of the OSD generates an instruction of performing an operation on a storage medium, for example, an instruction of deleting data on the storage medium. After the instruction of performing the operation on the storage medium is generated, a log may be recorded, and this log may be Committed. When the transaction is completed, that is, when the controller completes the operation, a log may be recorded, and this log may be Cleared. Then a resource, such as a storage resource, occupied by the transaction is released.

The conclusion received by a participant may be Commit, or may be Abort. After receiving the conclusion, the participant may not need to send an acknowledgement message that the conclusion has been received to the coordinator, and may not send an acknowledgement message that the conclusion has been executed.

The transaction processing method in step 21 to step 29 is independent, and is a complete transaction processing method. Step 21 to step 29 may be executed after step 13 or step 14 are executed, or may be applied to another scenario. For example, it is not that the original coordinator is faulty, but the original coordinator does not exist from the beginning, and a transaction processing system formed by only several participants performs transaction processing by negotiation. In such an embodiment, step 21 may not be included.

In the method of Embodiment 2, a part of the steps are executed by the coordinator, and the other part of the steps are executed by the participants. Step 23 to step 28 relate to comparison of three types of information in total which are a transaction ID, an object ID, and a version number, and a transaction conclusion may be drawn according to a comparison result. This process may also include the following four conclusions. The four conclusions are in parallel, and are not interdependent. Therefore, it is a complete solution when the embodiment of the present invention implements at least one of the four conclusions.

(1) If any one of the response messages carries first information, the conclusion is to execute the transaction, where the first information indicates that the participant that sends the first information does not contain the received transaction ID and contains the received object ID, and the received change information of the object is the same as change information of the object of its own.

(2) If any one of the response messages carries second information, the conclusion is to abort the transaction, where the second information indicates that the participant that sends the second information does not contain the transaction ID and contains the object ID, and the received change information of the object is different from change information of the object of its own.

(3) If all the response messages returned by the participants carry third information, the transaction conclusion is to execute the transaction, where the third information indicates that the participant that sends the third information contains the received transaction ID.

(4) If any of the response messages returned by the participants carries fourth information, for operations of create or modify, the transaction conclusion is to cancel execution of the transaction, and for an operation of delete, the transaction conclusion is to execute the transaction. The fourth information indicates that the participant that sends the fourth information does not contain the received transaction ID and does not contain the received object ID.

Embodiment 3

Figure 3:
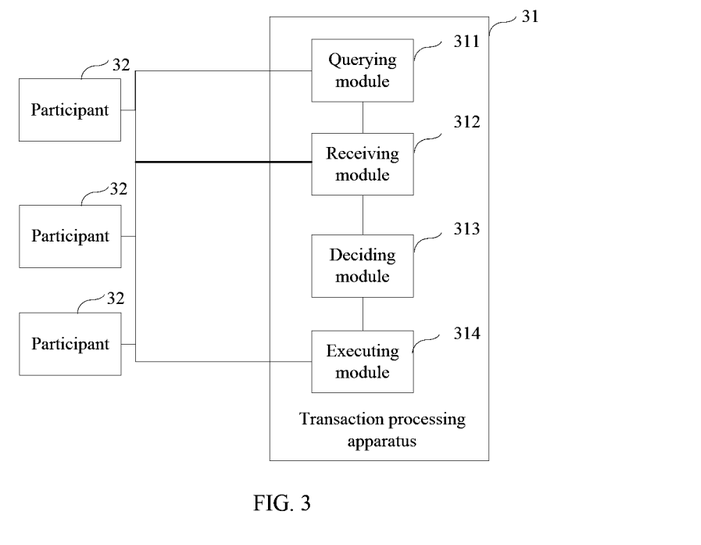
FIG. 3 is a schematic diagram of a transaction processing apparatus according to an embodiment of the present invention.

As shown in FIG. 3, another embodiment of the present invention further provides a transaction processing apparatus 31, which can apply the method of Embodiment 2. The transaction processing apparatus 31 is communicatively connected to participants 32, and an object operated by a transaction is formed by a plurality of sub-objects, where one of the sub-objects is in the transaction processing apparatus, and the other sub-objects are in different participants. The transaction processing apparatus 31 includes a querying module 311, a receiving module 312, a deciding module 313, and an executing module 314.

The querying module 311 is configured to send a query message to each participant 32, where the query message carries a transaction ID, an object ID, and a version number of the object, where the transaction ID is used to identify the transaction, and the object ID is used to identify the object.

The receiving module 312 is configured to receive a response message for the query message from each participant.

The deciding module 313 is configured to draw a conclusion according to the response messages, and send the conclusion to all the participants, where the conclusion includes at least one of the following:

(1) If any one of the response messages carries first information, the conclusion is to execute the transaction, where the first information indicates that the participant that sends the first information does not contain the received transaction ID and contains the received object ID, and the received version number of the object is the same as a version number of the object of its own.

(2) If any one of the response messages carries second information, the conclusion is to abort the transaction, where the second information indicates that the participant that sends the second information does not contain the transaction ID and contains the object ID, and the received version number of the object is different from version number of the object of its own.

(3) If all the response messages returned by the participants carry third information, the transaction conclusion is to execute the transaction, where the third information indicates that the participant that sends the third information contains the received transaction ID.

(4) If any of the response messages returned by the participants carries fourth information, for operations of create or modify, the transaction conclusion is to cancel execution of the transaction, and for an operation of delete, the transaction conclusion is to execute the transaction. The fourth information indicates that the participant that sends the fourth information does not contain the received transaction ID and does not contain the received object ID.

The executing module 314 is configured to execute the conclusion of the deciding module 313, and send the conclusion to all the participants 32.

After receiving the conclusion of the executing module 314, the participant 32 can execute the conclusion.

In the embodiment of the present invention, the coordinator 31 and the participants 32 are all object-based storage devices OSDs, and the transaction is reading of all the sub-objects, deleting of all the sub-objects, and writing of all the sub-objects.

Embodiment 4

Figure 4:
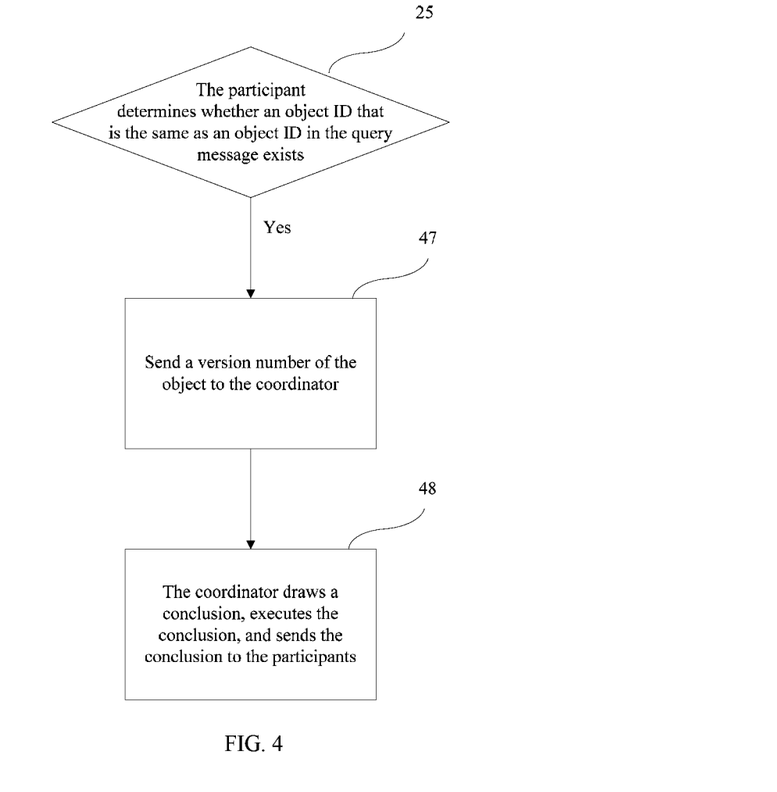
FIG. 4 is a flowchart of a transaction processing method according to an embodiment of the present invention.

It should be noted that, as shown in FIG. 4, another implementation manner of the transaction processing method is provided. The implementation manner is similar to the implementation manner disclosed in Embodiment 2, with one of differences in that: The coordinator may compare whether the Version_C and the Version_T are the same.

In this implementation manner, the query message sent by the coordinator in step 22 may not include the current version number Version_T of the object, and therefore, in this embodiment, the response message sent by the participants may carry a third information or a fourth information, instead of a first information or a second information.

Correspondingly, after a result determined in step 25 is yes, step 47 is performed: The participant that receives the query message reads a version number Version_C of the object identified by the object ID, and sends the Version_C to the coordinator. The participant does not perform comparison of whether the versions are the same, and does not send response information about whether the versions are the same to the coordinator.

In step 47, the participant may send a response message carrying a fifth information, where the fifth information further includes a version number of the object in the participant that sends the response message. The fifth information may further indicate that the participant does not contain the transaction ID but contains the object ID.

Then step 48 is performed: The coordinator compares the object version of the participant carried in the response message with the target version number recorded by the coordinator, where a comparison manner is basically the same as that in step 27, and a difference is in that an entity for executing the comparison is the participant. After a comparison result is obtained, a conclusion is drawn according to a same manner as that in step 28, and the conclusion is executed.

The coordinator may have functions of simultaneously detecting whether the third information, the fourth information, and the fifth information exist, and drawing a conclusion according to a detecting result. Alternatively, the coordinator may have functions of only detecting whether any one of the third information, the fourth information, and the fifth information exists, and drawing a conclusion according to a detecting result. The conclusion includes at least one of the following.

(1) If all the response messages returned by the participants carry the third information, the transaction conclusion is to execute the transaction, where the third information indicates that the participant that sends the third information contains the received transaction ID.

(2) If any of the response messages returned by the participants carries fourth information, for operations of create or modify, the transaction conclusion is to cancel execution of the transaction, and for an operation of delete, the transaction conclusion is to execute the transaction. The fourth information indicates that the participant that sends the fourth information does not contain the received transaction ID and does not contain the received object ID.

(3) If any of the response messages returned by the participants carries fifth information, a conclusion may be drawn according to the fifth information, where the conclusion includes at least one of the following: (i) if the version number information returned to the coordinator by the participant is the same as the target version number recorded by the coordinator, the conclusion is to execute the transaction; or, (ii) if the version number information returned to the coordinator by the participant is different from the target version number recorded by the coordinator, the conclusion is to abort the transaction. The fifth information indicates that the participant does not contain the received transaction ID but contains the received object ID; and the fifth information further carries a version number of the object in the participant that sends the response message.

Embodiment 5

Referring to FIG. 3 as well, another embodiment of the present invention provides a transaction processing apparatus 31, which can apply the method of Embodiment 4. The transaction processing apparatus 31 is communicatively connected to participants 32, and an object operated by a transaction is formed by a plurality of sub-objects, where one of the sub-objects is in the transaction processing apparatus, and the other sub-objects are in different participants. The transaction processing apparatus 31 includes a querying module 311, a receiving module 312, a deciding module 313, and an executing module 313.

The querying module 311 is configured to send a query message to each participant 32, where the query message carries a transaction ID and an object ID, where the transaction ID is used to identify the transaction, and the object ID is used to identify the object.

The receiving module 312 is configured to receive a response message for the query message from each participant 32, where the response message carries the fifth information, which indicates that the participant does not contain the transaction ID but contains the object ID, and the fifth information further carries a version number of the object in the participant that sends the response message.

The deciding module 313 is configured to draw a conclusion according to the response messages, execute the conclusion by the coordinator, and send the conclusion to all the participants, where the conclusion includes at least one of the following: if the version number of the object in the participant is the same as a version number of the object in the coordinator, the conclusion is to execute the transaction; or, if the version number of the object in the participant is different from a version number of the object in the coordinator, the conclusion is to abort the transaction.

The executing module is configured to execute the conclusion of the deciding module.

Embodiment 6

Figure 5:
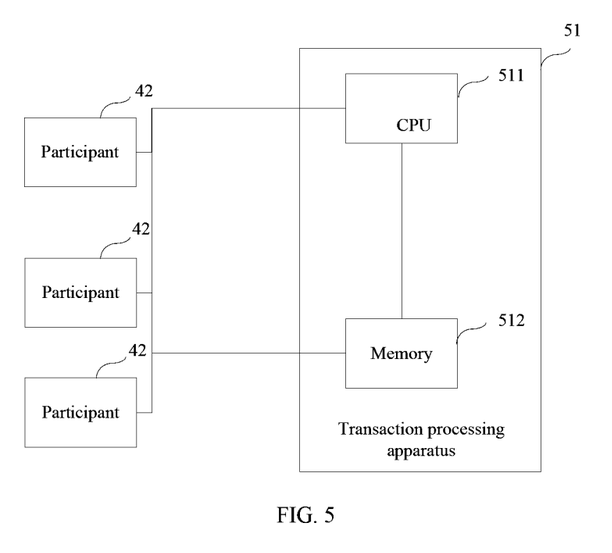
FIG. 5 is a schematic structural diagram of a coordinator according to an embodiment of the present invention.

As shown in FIG. 5, another embodiment of the present invention provides a coordinator 51, which is communicatively connected to participants 42, where an object operated by a transaction is formed by a plurality of sub-objects, where one of the sub-objects is in the coordinator, and the other sub-objects are in different participants. The coordinator includes a processor (Processor) 511 and a memory 512 which communicates with the processor, where the memory is configured to store a program, and the processor is configured to execute the program. The program can execute one or more of the foregoing methods, for example, one or more of the methods described in Embodiment 1, Embodiment 2, and Embodiment 4.

One program executed by the processor 511 in the embodiment is used to: send a query message to each participant, where the query message carries a transaction ID, an object ID, and a version number of the object, where the transaction ID is used to identify the transaction, the object ID is used to identify the object, the version number of the object is used to identify whether content of the object changes, and content of the object with different version numbers is different; receive a response message for the query message from each participant; and draw a conclusion according to the response messages, execute the conclusion, and send the conclusion to all the participants. The conclusion includes at least one of the following: if any one of the response messages carries first information, the conclusion is to execute the transaction, where the first information indicates that the participant does not contain the transaction ID and contains the object ID, and the version number of the object in the participant is the same as a version number of the object in the coordinator; or, if any one of the response messages carries second information, the conclusion is to abort the transaction, where the second information indicates that the participant does not contain the transaction ID and contains the object ID, and the version number of the object in the participant is different from a version number of the object in the coordinator.

One program executed by the processor 511 in the embodiment is used to: send a query message to each participant, where the query message carries a transaction ID and an object ID, where the transaction ID is used to identify the transaction, the object ID is used to identify the object, a version number of the object is used to identify whether content of the object changes, and content of the object with different version numbers is different; receive a response message for the query message from each participant, where the response message carries the fifth information, the fifth information indicates that the participant does not contain the transaction ID but contains the object ID, and the fifth information further carries the version number of the object in the participant that sends the response message; and draw a conclusion according to the response messages, execute the conclusion by the coordinator, and send the conclusion to all the participants. The conclusion includes at least one of the following: if the version number of the object in the participant is the same as a version number of the object in the coordinator, the conclusion is to execute the transaction; or, if the version number of the object in the participant is different from a version number of the object in the coordinator, the conclusion is to abort the transaction.

The processor 511 may be a central processing unit CPU, or an application-specific integrated circuit ASIC (Application Specific Integrated Circuit), or one or more integrated circuits which are configured to implement the embodiment of the present invention. The memory 512 may include a high-speed RAM memory, or may further include a non-volatile memory (non-volatile memory), for example, at least one disk memory.

According to the foregoing descriptions of the implementation manners, it may be clearly understood that the present invention may be implemented by software plus necessary universal hardware, and certainly, may also be implemented by hardware, but in many cases, the former one is a preferable implementation manner. Based on such an understanding, the technical solutions of the present invention essentially or the part contributing to the prior art may be implemented in a form of a software product. The software product is stored in a readable storage medium, such as a floppy disk, a hard disk, or an optical disc of a computer, and includes several instructions for instructing a computer device (which may be a personal computer, a server, a network device, or the like) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transaction processing method, performed by an object-based storage device (OSD) in an OSD system that includes a first OSD acting as a coordinator and other OSDs acting as participants, the method comprising: electing a second OSD from the other OSDs as a new coordinator when the first OSD is faulty, wherein a coordinator determines whether to commit or revoke a transaction, a transaction is writing, deleting, or modifying an object, an object is distributed data stored in other OSDs, and a participant executes a determined transaction; sending, by the second OSD, a query message to the remaining OSDs acting as participants, wherein the query message carries: a transaction ID of the transaction in the second OSD, an object ID in the second OSD, and a version ID of the object in the second OSD, wherein the object obtains a new version ID when content of the object updated; receiving, by the second OSD, a response message for the query message from the remaining OSDs acting as participants, wherein the response message designates whether the transaction ID, object ID and the version received exist locally in the remaining OSDs; executing the transaction and releasing a resource occupied by the transaction after executing, by the second OSD, when the second OSD determines based on the response message from any one of the remaining OSDs acting as participants that the transaction ID does not exist, the object ID exists, and the version ID exists; and instructing, by the second OSD, all the remaining OSDs acting as participants to execute the transaction and release the resource occupied by the transaction after executing.

2. The method according to claim 1, wherein, before the electing, the method further comprises: sending, by the first OSD, the transaction ID, the object ID and the second OSD to the other OSDs.

3. The method according to claim 1, wherein, before the electing, the method further comprises: sending, by the first OSD, an operation request to the other OSDs, wherein the operation request carries the object ID, an operation type, and the version ID; and sending, by the first OSD, a prepare command to the other OSDs, wherein the prepare command carries the transaction ID, the object ID, and the version ID; and allocating, by the other OSDs, the resource for the transaction.

4. An object-based storage device (OSD) system, the OSD system comprising: a plurality of OSDs, each of which comprises a processor; a first OSD acting as a coordinator; other OSDs acting as participants, wherein a coordinator determines whether to commit or revoke a transaction, a transaction is writing, deleting, or modifying an object, an object is distributed data stored in the other OSDs, and a participant executes a determined transaction; wherein a second OSD from the other OSDs is elected as a new coordinator when the first OSD is faulty; wherein the second OSD is configured to send a query message to the remaining OSDs acting as participants, wherein the query message carries: a transaction ID of the transaction in the second OSD, an object ID in the second OSD, and a version ID of the object in the second OSD, wherein the object obtains a new version ID when content of the object updated; wherein the remaining OSDs acting as participants are configured to: receive the query message and determine whether the transaction ID, the object ID and the version received exist locally, and send, to the second OSD, a response message regarding the query message; and wherein both the second OSD and the remaining OSDs acting as participants are further configured to execute the transaction, and release a resource occupied by the transaction after executing, if the response message from any of the remaining OSD designates that the transaction ID does not exist, the object ID exists, and the version ID exists.

5. The system according to claim 4, wherein: the second OSD and the remaining OSDs acting as participants are further configured to execute the transaction, and release a resource occupied by the transaction after executing, if the response message from all remaining OSDs are that the transaction ID exists; and the second OSD and the remaining OSDs acting as participants are further configured to execute the transaction, and release a resource occupied by the transaction after executing, if the response message from any remaining OSD is that both the transaction ID and the object ID do not exist.

6. A transaction processing method, performed by an object-based storage device (OSD) system that includes a first OSD acting as a coordinator and other OSDs acting as participants, the method comprising: electing a second OSD from the other OSDs as a new coordinator when the first OSD is faulty, wherein a coordinator determines whether to commit or revoke a transaction, a transaction is writing, deleting, or modifying an object, an object is distributed data stored in other OSDs, and a participant executes a determined transaction; sending, by the second OSD, a query message to the remaining OSDs acting as participants, wherein the query message carries: a transaction ID of the transaction in the second OSD and an object ID in the second OSD; receiving, by the remaining OSDs acting as participants, the query message and determining whether the transaction ID and the object ID exist locally; receiving, by the second OSD, a response message for the query message from the remaining OSDs acting as participants, wherein the response message indicates whether the transaction ID and the object ID received exist locally in the remaining OSDs and further indicates a version ID locally; and performing one of: executing the transaction and releasing a resource occupied by the transaction after executing, by the second OSD, when the second OSD determines based on the response message from any one of the remaining OSDs acting as participants that the transaction ID does not exist, the object ID exists, and the version ID exists in the second OSD; and instructing, by the second OSD, all the remaining OSDs acting as participants to execute the transaction and release the resource occupied by the transaction after executing; or revoking the transaction and releasing a resource occupied by the transaction after revoking, by the second OSD, when the second OSD determines based on the response message from any one of the remaining OSDs acting as participants that the transaction ID does not exist, the object ID exists, and the version ID does not exist in the second OSD; and instructing, by the second OSD, all the remaining OSDs acting as participants to revoke the transaction and release the resource occupied by the transaction after revoking.

7. The method according to claim 6, wherein, before the electing, the method further comprises: sending, by the first OSD, the transaction ID, the object ID and the second OSD to the other OSDs.

8. The method according to claim 6, wherein, before the electing, the method further comprises: sending, by the first OSD, an operation request to the other OSDs, wherein the operation request carries the object ID, an operation type, and the version ID; and sending, by the first OSD, a prepare command to the other OSDs, wherein the prepare command carries the transaction ID, the object ID and the version ID; and allocating, by the other OSDs, the resource for the transaction.

9. An object-based storage device (OSD) system, the OSD system comprising: a plurality of OSDs, each of which comprises a processor; a first OSD acting as a coordinator; other OSDs acting as participants, wherein a coordinator determines whether to commit or revoke a transaction, a transaction is writing, deleting, or modifying an object, an object is distributed data stored in the other OSDs, and a participant executes a determined transaction; wherein a second OSD from the other OSDs is elected as a new coordinator when the first OSD is faulty; wherein the second OSD is configured to send a query message to the remaining OSDs acting as participants, wherein the query message carries: a transaction ID of the transaction in the second OSD, an object ID in the second OSD; wherein the remaining OSDs acting as participants are configured to: receive the query message and determine whether the transaction ID and the object ID exist locally, and send a local version ID and a response message regarding the query message to the second OSD; and wherein, if the response message from any remaining OSD indicates that the transaction ID does not exist, the object ID exists, the second OSD and the remaining OSDs acting as participants are further configured to: execute the transaction and release a resource occupied by the transaction after executing, if the version received exists in the second OSD; and revoke the transaction and release a resource occupied by the transaction after executing, if the version received does not exist in the second OSD.

* * * * *